Figure 1:
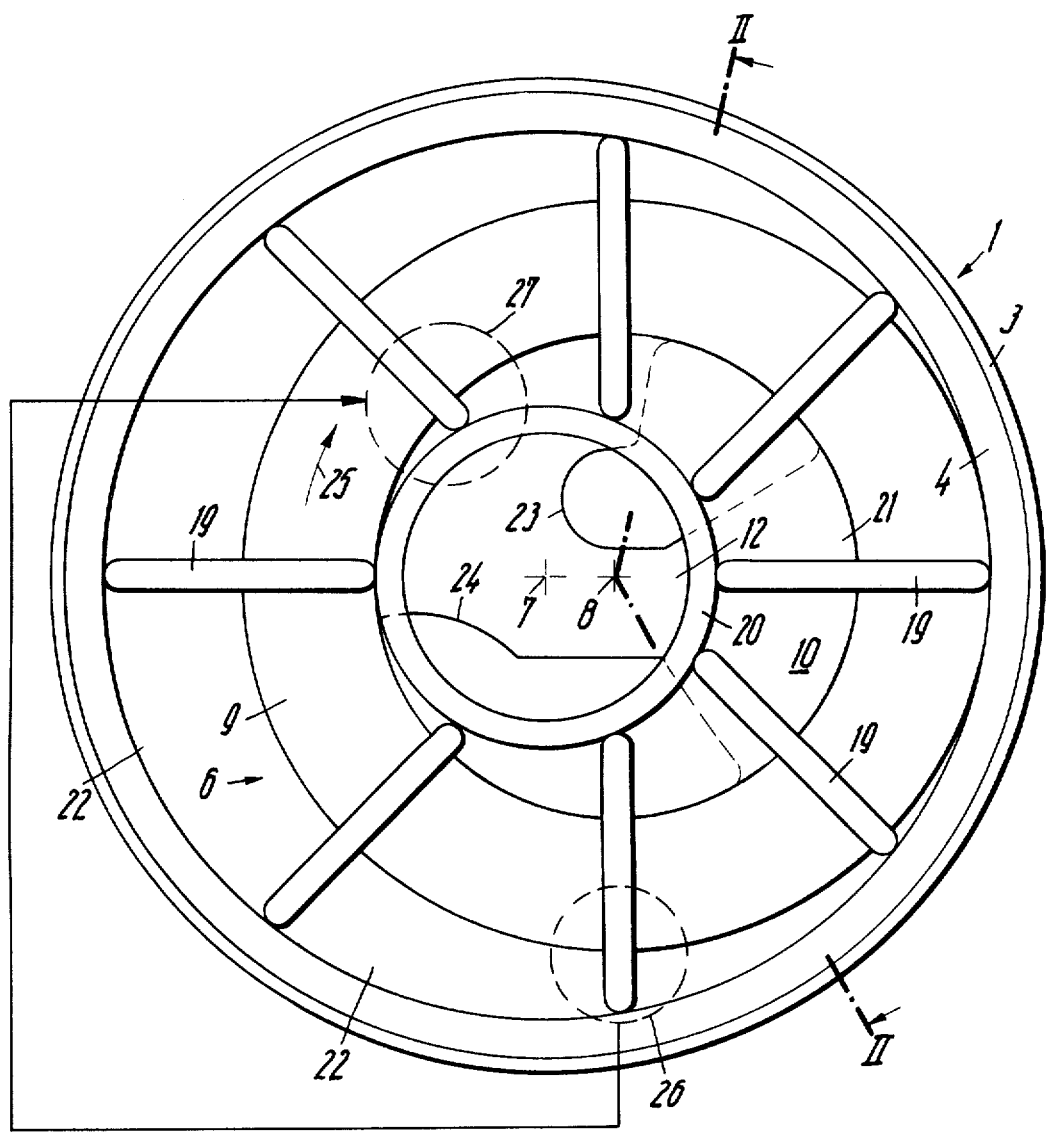

United States Patent

Rose

[11] 3,930,763
[45] Jan. 6, 1976

[54] ROTARY CELL PUMP FOR THE CONVEYING OF SAUSAGE STUFFING AND THE LIKE

[75] Inventor: Heinz Rose, Intschede, Germany

[73] Assignee: VEMAG Verdener Maschinen-und Apparatebau GmbH, Verden, Germany

[22] Filed: Sept. 17, 1973

[21] Appl. No.: 397,755

[30] Foreign Application Priority Data
Oct. 30, 1972 Germany............ 2253142

[52] U.S. Cl. ................................ 418/6; 17/37
[51] Int. Cl.² ............................ F01C 13/00
[58] Field of Search ........... 418/157, 6, 15, 16, 93, 418/177; 17/34, 35, 37

[56] References Cited
UNITED STATES PATENTS

| | | | |
|---|---|---|---|
| 1,607,383 | 11/1926 | Aurand | 418/6 |
| 1,626,973 | 5/1927 | Schaurte | 418/177 |
| 2,287,369 | 6/1942 | Anderson | 418/257 |
| 2,368,572 | 1/1945 | Say | 418/257 |
| 2,512,593 | 6/1950 | Brown | 418/177 |
| 2,653,548 | 9/1953 | Bodensieck | 418/177 |
| 2,759,664 | 8/1956 | Auwarter | 418/6 |
| 2,907,307 | 10/1959 | Striegl | 418/177 |
| 3,115,871 | 12/1963 | Luck | 418/113 |
| 3,381,668 | 5/1968 | Agren | 418/257 |
| 3,543,330 | 12/1970 | Muller | 17/37 |
| 3,631,565 | 1/1972 | Muller | 17/37 |
| 3,742,556 | 7/1973 | Beasley | 17/37 |

Primary Examiner—Henry F. Raduazo
Attorney, Agent, or Firm—Olson, Trexler, Wolters, Bushnell & Fosse, Ltd.

[57] ABSTRACT

A rotary cell pump is provided for the conveying of sausage stuffing and the like. The pump has a stationary hub and a stator surrounding the hub in concentric relation therewith and an eccentric rotor. The rotor divides the pump into an inner pumping chamber for the sausage mix and an outer pump chamber forming an air pump to evacuate air from the sausage mix.

6 Claims, 2 Drawing Figures

ROTARY CELL PUMP FOR THE CONVEYING OF SAUSAGE STUFFING AND THE LIKE

The invention relates to a rotary cell pump for the conveying of sausage stuffing or the like. The pump has a stationary hub and a stator surrounding the hub concentrically at a distance between which a ring-shaped rotor is placed which is turnable around an axle eccentric to the hub axle. The pump also has an inlet and an outlet for the material to be conveyed.

It has been known to use such rotary cell pumps for the conveying of sausage or stuffing. In the manner customary in connection with rotary cell pumps, the conveyed material is transported in the chambers formed between stator and rotor and also the vanes by having inlet and outlet arranged in the area of the pointed ends of the generally crescent or sickle-shaped space between stator and rotor.

One of the main problems in connection with the conveying of sausage stuffing is caused by its sensitivity to friction. Friction of conveyed sausage stuffing on stationary walls leads to smearing, leadking out of fat, etc. especially because of the heating that occurs in this connection. It is true, friction cannot be prevented entirely in feed pumps — in which it is most critical — but efforts must be made to reduce the friction between feed pump and conveyed material as well as its harmful effect.

It is the problem of the invention to attain this with the feed pump described in the beginning.

For the solution of this problem the invention starts out from the premise that for the intensity of the influence of the friction there is determination both the size of the friction surfaces and also the pressure which is effective between the conveyed material and the friction surfaces of the feed pump. The friction on the radially outer walls in a rotary cell pump of the present type is greater than the pressure on the radially inner chamber walls because of the centrifugal force exerted by the conveyed material on the chamber walls, which lie radially outside. The invention consists in that the inlet and the outlet are disposed at the space between hub and rotor (inner pump room) and that the rotor forms the radially outside walls of the conveying chambers.

Accordingly the outer chamber wall, which is especially pressure-loaded, rotates with the conveyed material so that there is no friction at this location because of the absence of relative movement. According to a preferred further development of the invention, the relative movement and thereby the influence of friction is reduced further by the fact that the part of the bottom of the pump housing forming the stator, that lies below and radially within the rotor, also rotates with the rotor.

Preferably the conveying effect of the chambers between stator and rotor is utilized by connecting, for the air removal from the conveyed material, the suction area of the space between rotor and stator (outer pump room) with the suction area of the inner pump room by means of a stationary channel.

For a better connection of inlet and outlet and axes of the stator and rotor preferably are inclined by 45° relative to the vertical while in the pump housing the inlet channel is led over 45° and therefore is vertical, while the outlet channel is led over 45° and therefore is horizontal. For the same purpose the inlet channel and the outlet channel preferably are at least partly worked into the hub.

Figure 2:
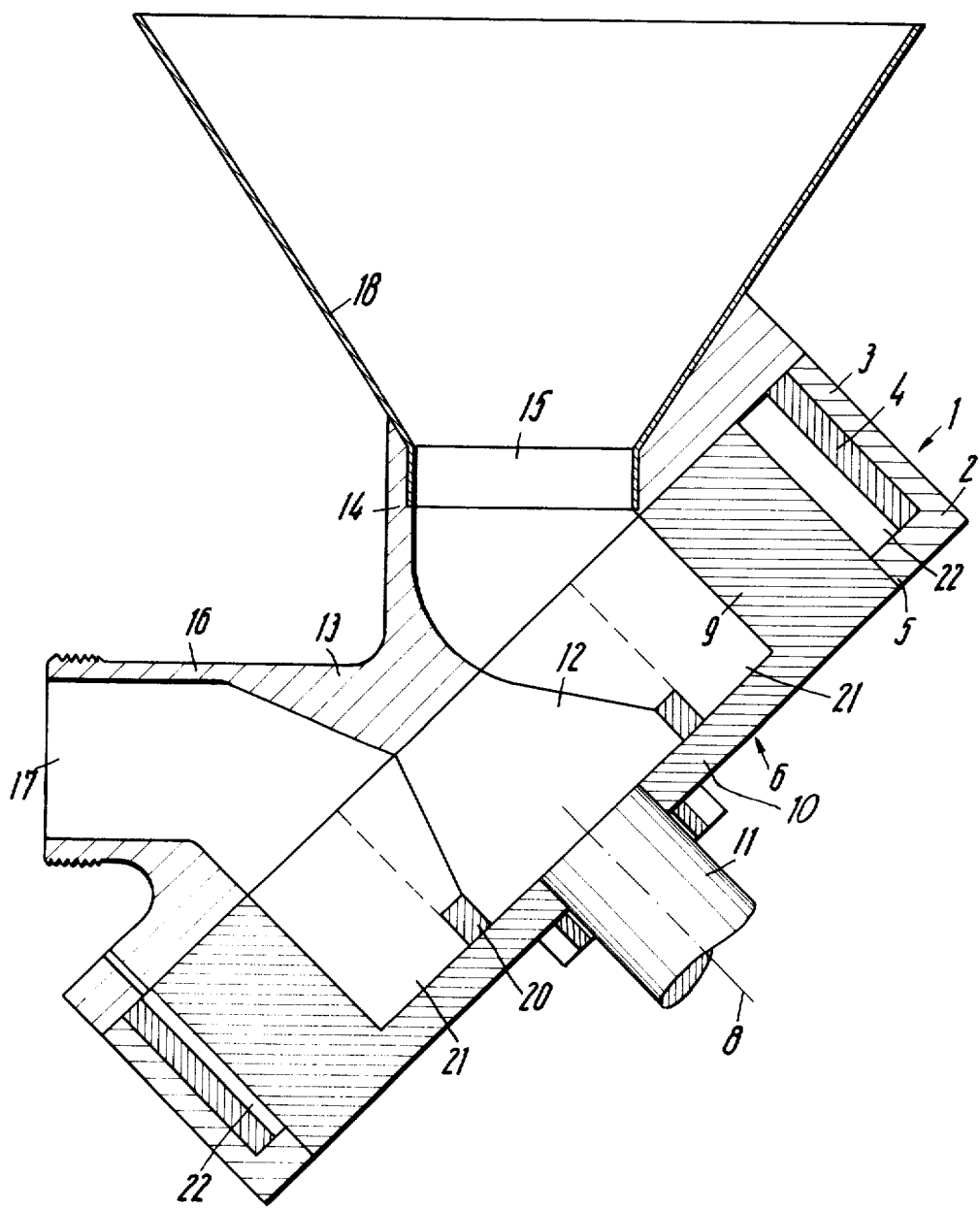

The drawings illustrate the invention schematically on a typical example and there shows:

FIG. 1 is a view from above on the rotary cell pump with the cover of the housing removed; and FIG. 2 is a section essentially according to line II—II in FIG. 1.

The stator, designated as a whole by 1, consists of a cup-shaped pump housing 2 whose peripheral wall 3 is lined inside by a bushing 4. In the bottom 5 of the housing 2 there is eccentrically placed the rotor 6 designated as a whole by 6. In FIG. 1 the eccentricity between the axle 7 of the stator 1 and thereby of the pump housing 2 in relation to the axle 8 of the rotor 6 is readily seen. The rotor 6 is designed cupshaped in a similar manner as the pump housing 2. It consists of a circular ring 9 with an integral bottom 10 which is a continuation of the bottom 5 of the pump housing 2. The bottom 10 and with it the entire rotor 6 is rotatable around an axle journal 11 which is part of the stationary hub 12 and extends from this hub through the bottom 10 of the rotor 6.

Toward the top the pump housing is closed by a cover 13 on which the connecting pieces 14 for the inlet 15 and 16 for the outlet 17 are disposed. The channels of the inlet 15 and the outlet 17 open essentially axially into the inside space of the pump and are directed 45° to the axes in opposite directions so that the connecting pieces of inlet 15 and outlet 17 form a right angle. FIG. 2 shows clearly how the entire pump is inclined 45° in such a way that the inlet 15 stands vertical and the outlet 17 runs horizontally. A filling funnel 18 is mounted on the connecting piece 14 of the inlet 15. The vanes 19 are arranged radially movable (in relation to axle 8) in the circular ring 9 of the rotor 6. They slide on the inside of bushing 4 in the pump housing 2 and outside a bushing 20 corresponding to bushing 4. Bushing 20 surrounds hub 12. The circular ring 9 subdivides the inner space of the pump into an inner pump chamber 21 between hub 12 or bushing 20, and circular ring 9, and an outer pump chamber 22 between circular ring 9, and housing wall 3 or bushing 4. Both pump room 21 and 22 are (opposing) crescent or sickle-shaped and are subdivided into individual chambers by means of vanes 19. The channels of inlet 15 and outlet 17 open into pump chambers 21 and continue in the pump in the form of recesses 23 and 24 worked into the hub 12 and the bushing 20. The continuations of the recesses 23 and 24 which are drawn by broken lines in FIG. 1, indicate what the total cross section of the inlet and outlet channels in cover 13 look like at the transition from the cover to the pump housing 2.

The conveyed material entering through the previously mentioned inlet cross section enters into the inner pump chamber 21 and is taken along by the vanes 19 when these move with the circular ring 9 of the rotor 6 in the direction of arrow 25. While the chambers formed by the vanes 19 in the inner pump chamber extend during the passing of the inlet and also shortly afterwards because of the eccentric arrangement of the circular ring 9, they get smaller subsequently in the direction of the outlet 17 and when the conveyed material reached the outlet, it is moved out through it.

Not shown is a stationary channel which goes through the cover 13 and which, at 26, opens into the suction area of the outer pump chamber 22 and, at 27, into the suction area of the inner pump chamber 21, namely in the direction of the rotor 6, before the inlet. With the help of the sections of vanes 19 — effective in the outer pump chamber 22 — which also subdivide the outer pump chamber 22 into chambers, reduced pressure (or vacuum) is applied in this manner to the inner pump chamber which removes air from the conveyed material entering through the inlet. It is to be noted that the outer pump chamber is considerably bigger than the inner pump chamber so that relatively large quantities of air can be moved. In connection with this there is the advantage, which is important for clean conveying of the conveyed material, that the conveyed material in the inner pump chamber moves only relatively short distances. The specific example herein shown and described is for illustrative purposes only. Various changes in structure will occur to those skilled in the art and form a part of the present invention insofar as they fall within the spirit and scope of the appended claims.

The invention is claimed as follows:

1. A rotary pump for pumping material mixed with air comprising; a stationary hub and a stator surrounding the hub in concentric spaced relation therewith, a rotor disposed between said hub and said stator and eccentric relative to said hub and stator, said rotor with said hub and said stator comprising an inner material pump chamber and an outer air removal pump chamber respectively, said inner pump chamber receiving material having entrapped air therewith, means providing an inlet to said inner pump chamber to receive material and entrapped air therein, and means providing an outlet from said inner pump chamber and means to force said material therefrom and fluid flow means connected between said inner and outer chambers to extract entrapped air from the material within said inner chamber, means for venting said outer chamber.

2. A pump according to claim 1 wherein the inlet means and the outlet means both extend generally in the same direction axially of said hub.

3. A pump as set forth in claim 2 wherein the hub and stator axes are inclined at substantially 45° to the vertical, and wherein the inlet means and the outlet means are provided with branches respectively substantially vertical and substantially horizontal.

4. A pump as set forth in claim 1 wherein the outer pump chamber comprises an air pump, and means providing a connection for the said inner chamber and said outer pump chambers for pumping air from the material mix.

5. A pump as set forth in claim 1 wherein the pump has a housing with a bottom plate at least part of which rotates with the rotor.

6. A pump as set forth in claim 5 wherein the rotor bottom part of the housing is integral with the rotor.

* * * * *